United States Patent Office 3,127,323
Patented Mar. 31, 1964

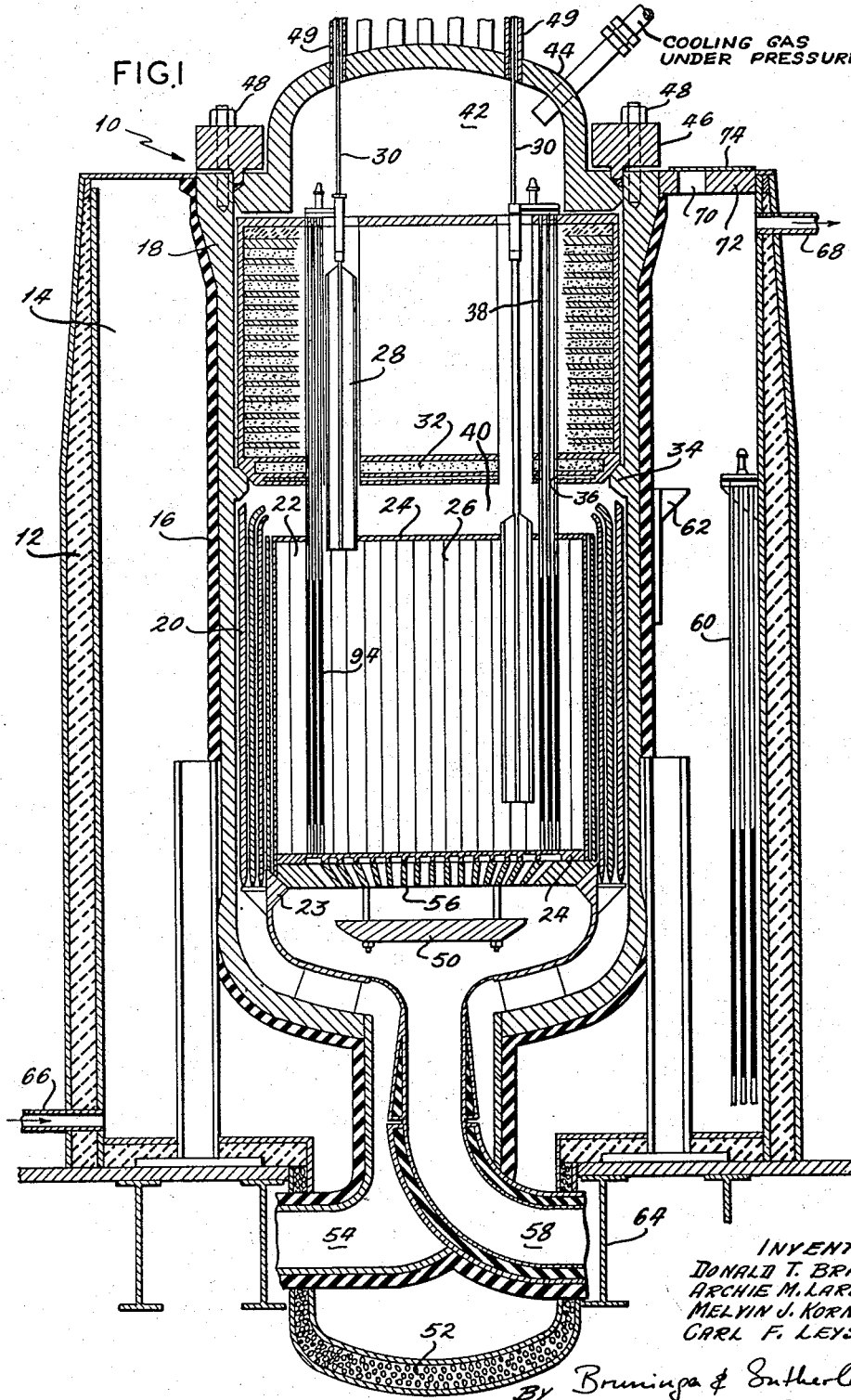

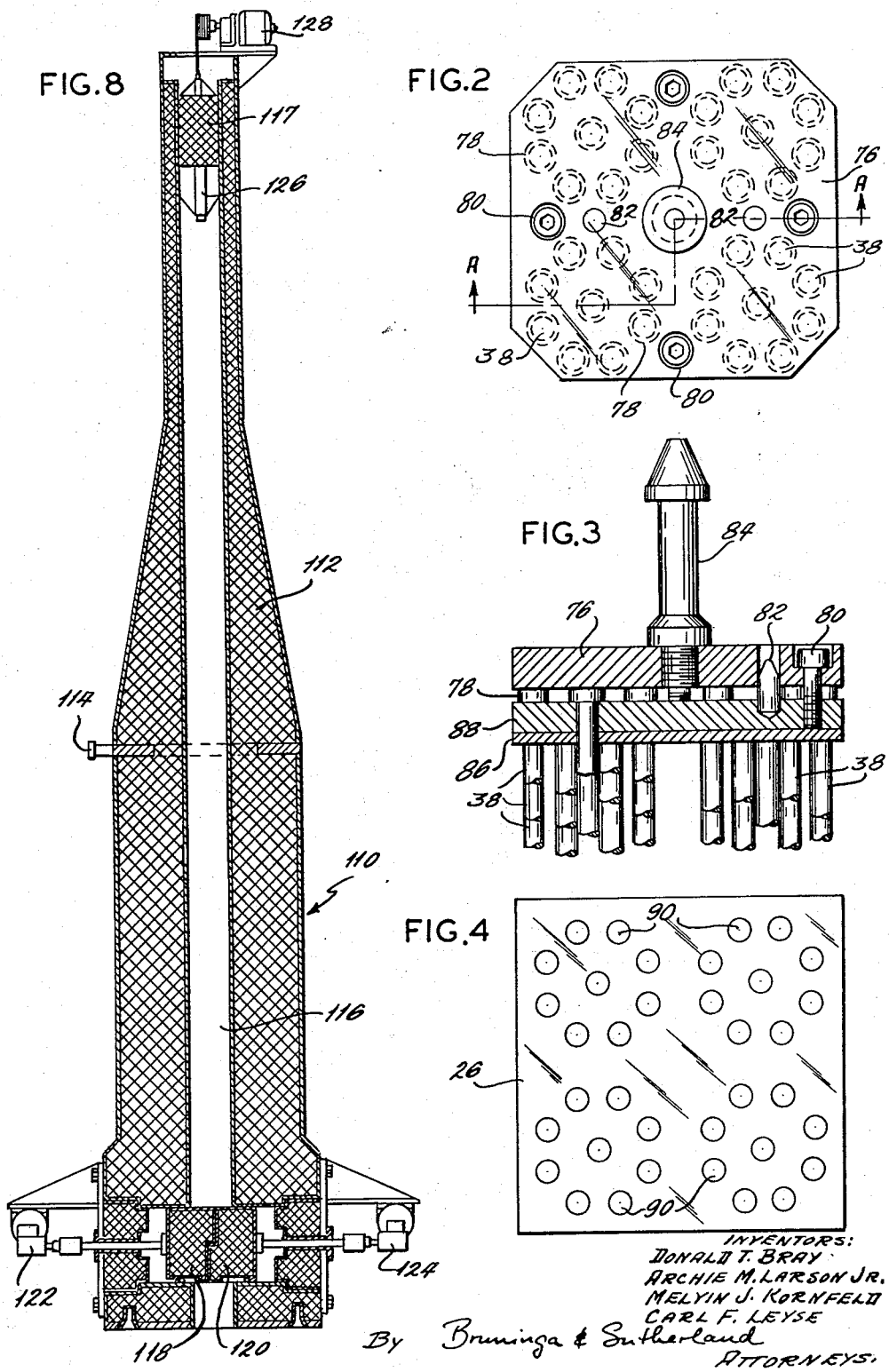

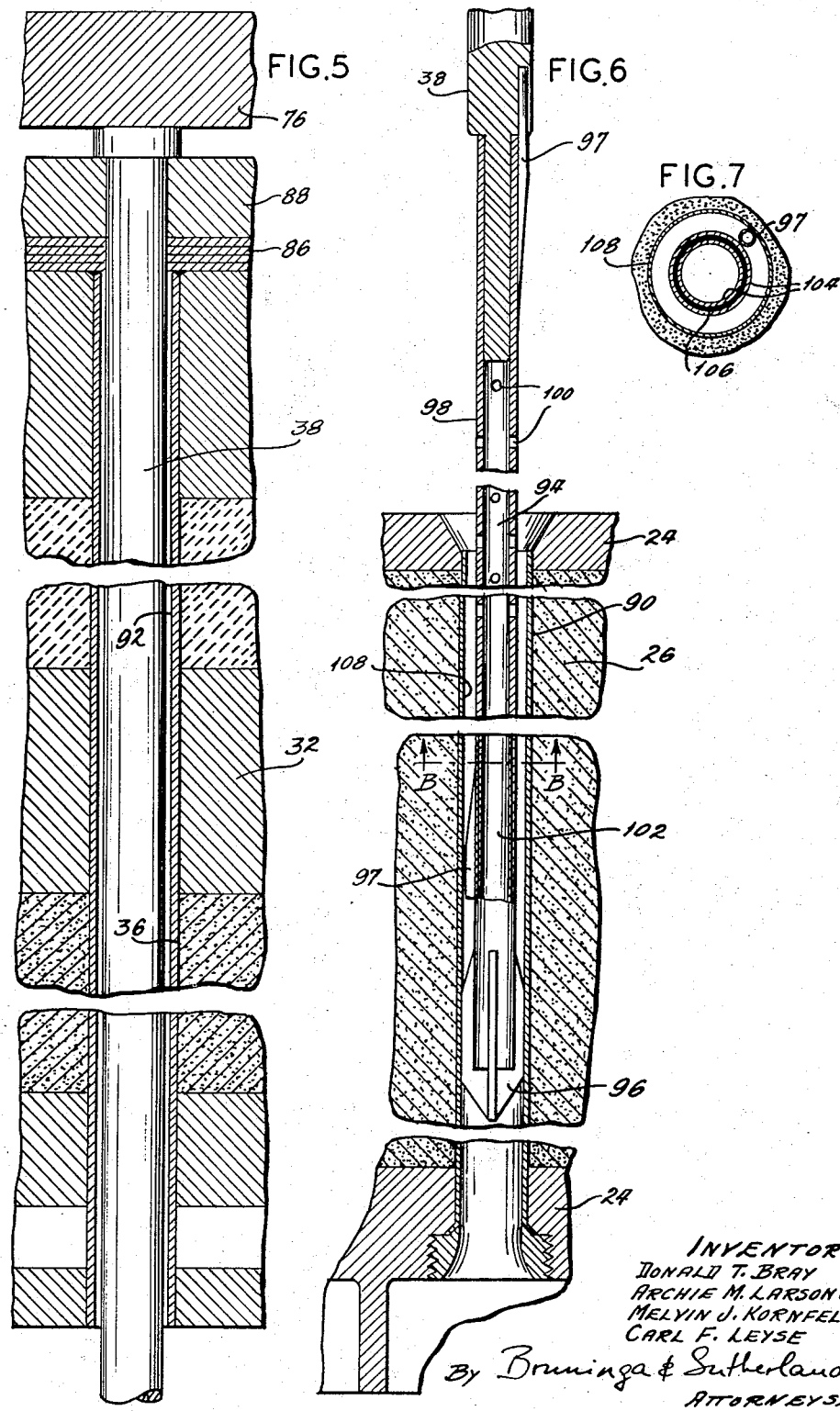

3,127,323
SHIELDING FOR NUCLEAR REACTORS
Donald T. Bray, Rome, Italy, and Archie M. Larson, Jr., Richmond Heights, Melvin J. Kornfeld, St. Louis, and Carl F. Leyse, Manchester, Mo., assignors to Internuclear Company, Clayton, Mo., a corporation of Missouri
Filed Oct. 31, 1957, Ser. No. 693,678
5 Claims. (Cl. 176—59)

This invention relates to nuclear reactors and more particularly to those of the pressurized gas-cooled type as may be used for example in ship propulsion. Pressurized gas-cooled nuclear reactors for ship propulsion and other purposes have been known for some time. They have, however, had the disadvantage that it was not easily possible to replace fuel elements without exposing operating personnel to severe radiation hazards. To overcome these disadvantages, this invention teaches the use of a biological shield within the reactor vessel to allow access of maintenance and operating personnel to the control rod drive mechanisms, the pressure vessel head, and the flanges and seals, and to allow operating personnel to load and unload fuel by direct rather than remote handling methods.

This type of shield is not generally needed in pressurized water reactors because the water moderator and coolant sufficiently attenuates the neutrons so that the type of access referred to above can be obtained. In gas cooled and liquid metal cooled reactors, however, such a shield is essential if access to the areas described above is to be maintained.

The shield between the core and the primary opening of the pressure vessel is composed of alternating layers of a low atomic weight material (such as graphite) and a high atomic weight material (such as steel) and has a plurality of openings which are normally filled with plugs, either solid or similar to the shield. These plugs may be an extension of the fuel element. Fuel can be loaded and unloaded through the top biological and neutron shield openings upon removal of the plugs and yet, during operation of the reactor, neutrons are prevented from penetrating to the rod drives, the top head of the pressure vessel, or the seal and flange areas, so that these areas do not become radioactive and hence permit direct access.

This invention also teaches the use of conical supports for reactor cores and thermal shields so that these cores and shields will remain centered with respect to the center line of the reactor vessel even though the vessel, the core, and the shields undergo considerable thermal expansion and contraction as a result of temperature changes in these structures during normal and emergency operations.

The primary object of this invention is therefore to provide a nuclear reactor of compact and simple design in which it is possible to allow operating personnel to work in the immediate vicinity of the reactor and to change or rearrange fuel elements without danger and without the use of remote-controlled equipment.

It is another object of this invention to provide a biological shield for a gas-cooled reactor which has the following advantages:

(1) It shields the top closure of the pressure vessel and personnel located thereon from radiation during startup, full operation, shutdown, fuel removal and fuel replacement.

(2) It permits full access at any time to the top of the pressure vessel, its closure and any equipment, such as control, safety and regulating rod drives, that may be located there without undue exposure to radiation.

(3) It permits the top of the pressure vessel, its closure, gas seal and any other equipment located on top of or inside the top closure, to operate at low temperatures regardless of the operating temperature of the main system.

(4) It permits used fuel elements to be removed from the reactor individually, in pairs, or in clusters, by means of a relatively light shielded cask.

(5) It permits operating personnel to guide and operate the used fuel element removal cask directly without the necessity of shielding other than that already provided and without undue exposure to radiation.

(6) It permits new fuel elements to be put in the reactor, singly, in pairs or in clusters by hand or machinery directly operated by personnel without undue exposure to radiation.

(7) It permits partially spent fuel elements to be rearranged in the core to give longer life and/or better flux distributions without undue exposure to radiation by operating personnel.

(8) It permits, for shipboard use, the practical carrying of the refueling facilities aboard the ship so that refueling can be performed independent of dockside facilities or special ports.

(9) It is an extremely simple mechanical device.

It is a further object of this invention to provide a reactor for shipboard use in which storage of spent fuel elements is provided within the water shield of the reactor itself so as to make possible a refueling at sea without the use of any special dockside or land-borne facilities.

It is a still further object of this invention to provide a reactor in which the fuel tubes of the reactor core are always perfectly aligned with the refueling ducts in the biological shield.

We will now describe the functioning of a preferred embodiment of our novel reactor, reference being had to the accompanying drawings in which:

FIGURE 1 is an overall sectional view of the reactor of this invention in assembled form;

FIGURE 2 is a top view of a fuel rod support showing the geometrical disposition of the fuel rods;

FIGURE 3 is a section along line A—A in FIGURE 2;

FIGURE 4 is a plan view of one of the graphite blocks making up the interior of the reactor core;

FIGURE 5 is an elevation of the top portion of a fuel rod in position within the biological shield;

FIGURE 6 is a vertical section of a fuel element in position within the core;

FIGURE 7 is a horizontal section of a fuel element along line B—B of FIGURE 6; and FIGURE 8 is a vertical section of the coffin used in removing spent fuel elements from the reactor of this invention.

In FIGURE 1, a gas- cooled nuclear reactor constructed according to our invention is generally designated by the numeral 10. This reactor is composed of an outer lead shield 12, a water or other liquid hydrogenous shield 14, an inner insulating layer 16, and a metal housing 18. On the inside of the metal housing 18 are mounted three thermal shields 20 which are designed to absorb the heat produced within a core 22 so as to prevent excessive heat production within the metal housing 18. The core 22 rests in a centered position on an annular conical support 23 supported within the housing 18 and is composed of an inner steel housing 24 in which are located a number of graphite blocks 26, which serve as moderators for the neutrons emitted by the fuel elements 94 during the operation of the reactor. Interposed in slots among the graphite blocks are shim safety rods 28 which can be raised or lowered by handle 30 and which serve to compensate for the gradual depletion of the nuclear fuel by reducing the neutron absorption within the core as they are moved upward. As is well known to those skilled in the art, the momentary control of the speed of reaction and thus of the output power is achieved by neutron-absorbing regulating rods (not shown) which, like the shim safety rods, are adapted to be lowered into the core and regulate the neutron loss within the core in accordance with their position. Positioned above the core 22 is a biological shield 32 composed of alternating layers of steel and graphite with the top layer of graphite being replaced by lead. Biological shield 32 is held in a centered position with respect to core 22 by an annular conical support 34 which occupies a fixed position with respect to the outer housing 18. Shield 32 is provided with a number of steel-lined bores and slots 36 adapted to receive fuel rods 38, shim safety rods 28, and control rods (not shown). These bores 36 are just large enough to permit the passage of the particular fuel rod intended to be lowered through it, so as to allow a minimum amount of radiation to penetrate the biological shield 32. Dome 42 is provided with a top plug 44 held to the main housing 18 by means of steel ring 46 and nuts 48 on studs anchored in housing 18 and projecting through ring 46. The handles 30 of the regulating elements are brought out of top plug 44 through gas-tight housings 49.

A second thermal shield is provided below the bottom of the core at 50, whereas a bottom shield 52 of lead shot reduces the amount of radiation penetrating the bottom of the reactor vessel. Cooling gas under pressure is introduced into the reactor through inlet 54 and is conducted around the outside of the thermal shields 20 to the upper plenum 40. Another smaller gas stream which is cooled to about room temperature is brought through separate ducts (not shown) to the dome 42 and flows down through the holes 36 in shield 32 into the upper plenum 40. From upper plenum 40 the gas flows through the core 22 where the heat energy from the fuel elements is transferred to it. The hot gas leaves core 22 through the passages 56 and flows around lower thermal shield 50 and out through exit conduit 58.

The reactor is mounted on support beams 64, and water is supplied to the shield 14 through inlet 66 and exits through line 68. Spent fuel elements 60 are stored on hooks 62 within the water shield 14. Inasmuch as the primary biological reactor shield of the reactor of this invention is so designed that it contains water or other liquid hydrogenous material, the spent fuel can be located in this hydrogenous material and the water can serve as a convenient means of removing the decay heat. Since the primary side gamma shield 12 is outside the spent fuel, only a small amount of extra gamma shielding in the vicinity of the spent fuel is required to give acceptable radiation tolerance at the surface of the side shield. Spent fuel elements are introduced into the water shield 14 through port 70 in shield 72, and plate 74 is provided for closing the port 70 when it is not in use.

FIGURES 2 and 3 illustrate a possible fuel element assembly. 76 designates the fuel rod assembly top plate. Fuel rods 38 are held between top plate 76 and bottom plate 88, of the same configuration as top plate 76 and located directly below it, by means of widened heads 78. The top plate and support plate are held together by bolts 80, and locating pins 82 are provided for facilitating their assembly. A lifting pin 84 (FIGURE 3) is screwed into top plate 76. A spacer guide 86 is provided immediately beneath the bottom support plate 88 for the purpose of assuring exact positioning of the fuel rods 38.

In FIGURE 4, the graphite blocks 26 are shown to be provided with bores 90 which are adapted to receive the active portions of fuel rods 38.

In FIGURE 5, a steel sleeve or lining 92 is shown inside a bore 36 of biological shield 32. A fuel rod 38 fits snugly into the sleeve 92 and extends through it into the reactor core. As a matter of illustration only, the biological shield in a preferred embodiment of our invention could, for example, be constructed in layers in the following manner from top to bottom: A two-inch steel layer, a four inch lead layer, two inches of steel, then alternate layers of one inch of steel and three inches of graphite, for a total of about five and one-half feet, then a layer of steel one inch thick, followed by a half inch air space and a final closing layer of steel again one-half inch thick. It is to be understood that our biological shield can be manufactured from any suitable neutron and gamma attenuating materials and is not limited to the use of steel or graphite, and that the dimensions cited are in no way critical.

In FIGURE 6, a fuel element 94 is shown attached to the lower end of a fuel rod 38. Spiral steel tube 97 is provided for spacing fuel element 94 from the inside walls of sleeve 108 provided along the wall of bore 90 so as to prevent wear of the soft graphite walls of the bore 90 formed in graphite block 26. Thus, the cooling gas can freely flood all sides of fuel element 94. A fuel rod centering guide 96 is also provided at the bottom of fuel element 94 for guiding the element 94 within sleeve 108. The fuel element 94 itself consists of an inactive steel tube 98 provided with numerous holes 100 through which the cooling gas can enter the interior of the fuel element. Located between the holes 100 and the centering guide 96 is the active portion 102 of the fuel element. This active portion (FIGURE 7) is composed of two concentric stainless steel cylinders 104 which enclose between them a cylindrical tube of uranium oxide in a stainless steel matrix 106.

When it is desired to remove a group of fuel rods from the reactor, the reactor is shut down, the flow of primary cooling gas is stopped and the shutdown cooling system started. The primary loop gas is pumped to storage tanks or discharged. The top plug 44 is then removed and a coffin 110, such as shown in FIGURE 8, is placed in position above on the top surface of biological shield 32 and over the lifting pin 84 of the desired fuel rod assembly. Coffin 110 consists of a biological shield 112 provided with lifting lugs 114 and having a bore 116 which can be closed off against nuclear radiation by shield plugs 117 and 118, 120. When the coffin has been placed into position over the desired lifting pin, motors 122 and 124 are operated to pull coffin shield doors 118 and 120 apart whereupon a latching mechanism 126 is lowered through the bore 116 until it engages lifting pin 84. The latching mechanism 126 and the fuel rod assembly which has thus become attached to it is then lifted into the inside of bore 116 by motor 128. When the fuel rod assembly has been lifted all the way to the top of bore 116, motors 122 and 124 are again operated to push together the shielding plugs 118 and 120 so that the fuel rod assembly is now completely shielded against radiation. In this condition the coffin 110 can be lifted off of the biological shield 32 and can be transported to the port 70 in shield 72 (or to any similar unloading facility) where the process can be reversed and the spent fuel rod assembly can be lowered through port 70 into the water shield 14 to be suspended for storage from a hook 62. When the fuel rod assembly is in place on hook 62, the latching mechanism is disengaged by any well-known electrical or mechanical means and is withdrawn into the coffin 110.

In a similar manner, fuel rod assemblies can be moved from one position in the reactor to another, so as to permit a geometrical arrangement of the fuel elements in which they are most efficiently utilized until the very end of their useful life.

It is to be understood, of course, that the refueling procedure described above is illustrative only, as the invention herein resides in the structure which allows refueling by direct manual and visual guidance of the operating equipment, regardless of the actual type of equipment used.

In operation, when it is desired to place a reactor into service, top plug 44 is removed and fresh fuel elements are introduced into the reactor through the bores 36 in the biological shield 32. During this time, the shim safety rods 28 are all the way down and all the neutron-absorbing control rods (not shown) are in the lowest position so that no reaction can take place inside the core 22. When all the fuel rod assemblies are in place, the top plug 44 is replaced, and cooling gas under pressure is introduced into the reactor vessel through pipe 54. The control rods are then lifted out to the extent necessary to start the reaction, and the uranium oxide portions 106 of fuel elements 94 will begin to heat up. The heat developed by the fuel elements is removed by the cooling gas under pressure introduced into the reactor in the manner above described, and the heated gas flows out through conduit 58 to a turbine (not shown) where its heat energy is converted to a usable form of mechanical energy. During operation of the reactor, the top plug 44 serves as a gas-proof seal to maintain the gas pressure necessary for proper operation of the reactor.

Although one particular embodiment of our invention has been described herein, many variations thereof can be produced in practice without departing from the spirit of our invention, as may be dictated by the requirements of a particular installation or the practicalities of the design involved, and we do not intend to limit our invention to the embodiment described above, but to encompass any reactor structure which allows direct manual manipulation of the refueling equipment by reason of a biological shielding structure as defined in the appended claims.

Having thus described the invention, what is claimed and desired to be secured by Letters Patent is:

1. A gas-cooled nuclear reactor comprising a pressure vessel, said vessel having a primary opening, a pressure dome removably secured to said opening, a gas inlet to said dome, a reactor core within said vessel, a biological shield constructed to provide safe access by personnel to the top of said shield positioned interiorly of said vessel and filling a space therein between said core and said pressure done, tubular means in said shield and in said core arranged to form aligned passages for containing fuel tubes with fuel elements inserted in said tubular means of said core, a plurality of removable plugs for insertion in said tubular openings formed in said biological shield, said plugs closing said tubular means therein and preventing access to the reactor fuel elements said plugs being removable so as to allow removal of said fuel elements from said passages, a gas passage through said shield, and support means in said vessel of the self-centering type having inwardly and downwardly circumferentially extending surfaces engageable with corresponding surfaces on said shield and on said core to maintain passage alignment so that said plugs and fuel elements may be removed, said seals confining the flow of gas to said gas passage.

2. A gas-cooled nuclear reactor comprising a pressure vessel, said pressure vessel having a primary opening, a reactor core within said vessel, a biological shield constructed to provide safe access of personnel to the top of said shield positioned interiorly of said vessel and filling a space therein between said core and said primary opening, a removable closure closing said opening, means for introducing a cooling gas at high pressure into said primary opening side of said biological shield remote from said core, means for maintaining a differential in gas pressure on opposite sides of said biological shield with the lower gas pressure between said biological shield and said core, tubular means in said shield and in said core arranged to form aligned passages for containing fuel tubes with fuel elements inserted in said tubular means in said core, a plurality of removable plugs in said tubular means of said biological shield, a gas passage through said shield, said plugs being removable so as to allow removal of said fuel elements from said passages, and support means in said vessel of the self-centering type provided with downwardly and inwardly circumferentially extending surfaces engaging similar surfaces on said shield and on said core respectively to prevent the leakage of gas from a high pressure source to a low pressure source, said self-centering supports maintaining passage alignment to permit removal of said fuel elements and plugs.

3. A gas-cooled nuclear reactor comprising a pressure vessel, said pressure vessel having a primary opening, a reactor core within said pressure vessel, a biological shield constructed to provide safe access of personnel to the top of said shield positioned interiorly of said vessel and filling a space therein between said core and said primary opening, a closure removably closing said primary opening and forming a plenum chamber, means for introducing cool gas at high pressure into said plenum chamber on the side of said biological shield remote from said core, self-centering support means in said pressure vessel having downwardly and inwardly circumferentially extending surfaces engaging similar surfaces on said shield and on said core respectively, means for maintaining a differential in gas pressure on opposite sides of said biological shield with the lower gas pressure between said biological shield and said core, said surfaces isolating the high pressure side of said shield from the low pressure side of said shield, tubular means in said shield and in said core arranged to form passages maintained in alignment by said self-centering type of support means, fuel tubes with fuel elements inserted in said tubular means in said core, and a plurality of removable plugs in the tubular passages of said biological shield, said plugs when inserted therein preventing access to the reactor fuel elements and coacting with said biological shield to isolate said closure from radioactivity.

4. In a gas-cooled nuclear reactor comprising a core of nuclear fuel within a pressure vessel which includes a housing enclosing said core of nuclear fuel, said housing having a side with a primary opening, the improvement comprising a biological shield of material constructed to provide safe access by personnel to the top of said shield and disposed to fill a space in said pressure vessel in spaced relation to said core and between said core and said primary opening and having a plurality of apertures extending therethrough from the primary opening side of said shield to the side of said shield adjacent said core, a gas circulating system including a gas outlet from said housing adjacent said core and a gas inlet means for introducing the principal portion of the coolant gas into said housing between said shield and said core, and means for conducting gas from said gas circulating system and introducing this portion of said gas into said housing between said primary opening and said shield at a greater pressure and lower temperature than on the core side of said shield so as to cause said portion introduced between said primary opening and said shield to flow inwardly toward said core through said apertures in said shield and cool said housing on the opposite side of said shield from said core.

5. The method of maintaining the primary opening of a vessel for a gas cooled type of power reactor at low temperatures to permit ready access thereto for servicing operating equipment thereon, which reactor vessel has a gas permeable biological shield disposed within and filling a space between the primary opening toward one side of said vessel and a core of nuclear fuel for the reactor toward the opposite side of said vessel, which method includes the steps of forcing a main stream of coolant gas which includes all but a small portion of the coolant gas under pressure into the reactor vessel between said shield and said core, cooling said small portion of gas, forcing said small portion of gas into said reactor vessel on the primary opening side of said biological shield at a lower temperature and at a higher pressure than said main stream of gas so as to cause the small portion of gas to isolate the primary opening side of said vessel from the heat in the core and to cause said small portion of gas to discharge through said biological shield and rejoin the main stream of coolant gas to provide circulation, and then exhausting said gas from said nuclear vessel from the core side of said biological shield.

References Cited in the file of this patent

UNITED STATES PATENTS

| | | |
|---|---|---|
| 2,714,577 | Fermi et al. | Aug. 2, 1955 |
| 2,770,591 | Wigner et al. | Nov. 13, 1956 |
| 2,807,727 | Fermi et al. | Sept. 24, 1957 |
| 2,811,487 | Stanton | Oct. 29, 1957 |
| 2,816,068 | Ruano | Dec. 10, 1957 |
| 2,825,689 | Szilard et al. | Mar. 4, 1958 |
| 2,837,477 | Fermi et al. | June 3, 1958 |
| 2,851,410 | Vernon et al. | Sept. 9, 1958 |
| 2,852,458 | Dietrich et al. | Sept. 16, 1958 |
| 2,855,354 | Anderson | Oct. 7, 1958 |
| 2,856,339 | Wigner et al. | Oct. 14, 1958 |
| 2,861,033 | Treshow | Nov. 18, 1958 |
| 2,885,335 | Moore et al. | May 5, 1959 |

OTHER REFERENCES

Hughes: Pile Neutron Research, Addision-Wesley Publishing Co. (1953), p. 230.

Proceedings of the International Conference on Peaceful Uses of Atomic Energy, United Nations, New York (1955), vol. 3, pp. 299, 309.

Starr: Proceedings of the International Conference on the Peaceful Uses of Atomic Energy, August 1955, p. 104.

Journal of Nuclear Energy, volume 3 (August 1956), pp. 77, 80, 83, 88.